United States Patent
Ansari

(10) Patent No.: US 9,048,747 B2
(45) Date of Patent: Jun. 2, 2015

(54) SWITCHED-MODE POWER SUPPLY STARTUP CIRCUIT, METHOD, AND SYSTEM INCORPORATING SAME

(71) Applicant: Zahid Ansari, Cambridge (GB)

(72) Inventor: Zahid Ansari, Cambridge (GB)

( * ) Notice: Subject to any disclaimer, the term of this patent is extended or adjusted under 35 U.S.C. 154(b) by 235 days.

(21) Appl. No.: 13/682,554

(22) Filed: Nov. 20, 2012

(65) Prior Publication Data

US 2013/0127431 A1 May 23, 2013

Related U.S. Application Data

(60) Provisional application No. 61/563,198, filed on Nov. 23, 2011.

(51) Int. Cl.
*H02M 3/335* (2006.01)
*H02M 1/00* (2006.01)
*H02M 1/36* (2007.01)
*G05F 1/10* (2006.01)

(52) U.S. Cl.
CPC . *H02M 1/36* (2013.01); *G05F 1/10* (2013.01); *H02M 3/335* (2013.01); *H02M 2001/0032* (2013.01); *H02M 2001/0048* (2013.01); *Y02B 70/1491* (2013.01); *Y02B 70/16* (2013.01)

(58) Field of Classification Search
CPC ......... H02M 1/36; H02M 3/35; H02M 3/335; H02M 2001/006; H02M 2001/0032
USPC .......................... 363/49–50, 21.01–21.18, 16; 323/222–225, 271–275, 282–285
See application file for complete search history.

(56) References Cited

U.S. PATENT DOCUMENTS

| | | | | |
|---|---|---|---|---|
| 4,246,634 | A | * | 1/1981 | Purol ............................... 363/49 |
| 4,370,701 | A | * | 1/1983 | Western .......................... 363/20 |
| 4,695,936 | A | * | 9/1987 | Whittle ......................... 363/21.1 |
| 4,717,867 | A | * | 1/1988 | Forehand ...................... 323/223 |

(Continued)

FOREIGN PATENT DOCUMENTS

EP            1330016 A2      7/2003

OTHER PUBLICATIONS

PCT: International Search Report and Written Opinion of PCT/US2012/066419 (counterpart application); Mar. 6, 2014, (8 pgs.).

(Continued)

*Primary Examiner* — Timothy J Dole
*Assistant Examiner* — Yusef Ahmed
(74) *Attorney, Agent, or Firm* — Howison & Arnott, LLP

(57) ABSTRACT

A startup circuit delivers regulated startup current to a control IC in a switched-mode power supply (SMPS) system, and automatically disconnects the startup current when the SMPS Control IC starts switching the transformer or inductor used as the energy storage element in the SMPS system. Disconnection of the startup current may be triggered by detecting a time-varying voltage waveform on an accessible node in the SMPS system, or by detecting an increased current consumption by the SMPS Control IC, without requiring any ground reference to the SMPS Control IC, nor without requiring any logic signals generated by the SMPS Control IC. This provides for rapid and predictable startup of an SMPS Control IC and reduced power loss once the SMPS Control IC is operational, and is independent of the operating voltages of the SMPS control IC, and independent of the particular control scheme and switch topology of the SMPS system.

30 Claims, 11 Drawing Sheets

(56) References Cited

U.S. PATENT DOCUMENTS

| | | | | |
|---|---|---|---|---|
| 4,754,385 | A * | 6/1988 | McDade et al. | 363/16 |
| 4,887,199 | A | 12/1989 | Whittle | |
| 5,304,875 | A | 4/1994 | Smith | |
| 5,313,381 | A | 5/1994 | Balakrishnan | |
| 5,459,652 | A | 10/1995 | Faulk | |
| 5,477,175 | A * | 12/1995 | Tisinger et al. | 327/143 |
| 5,517,397 | A | 5/1996 | Quek et al. | |
| 5,519,889 | A | 5/1996 | Hipp | |
| 5,581,453 | A * | 12/1996 | Ueta et al. | 363/49 |
| 5,640,317 | A | 6/1997 | Lei | |
| 5,675,485 | A | 10/1997 | Seong | |
| 5,784,231 | A | 7/1998 | Majid et al. | |
| 5,812,385 | A * | 9/1998 | Leu | 363/49 |
| 5,815,383 | A * | 9/1998 | Lei | 363/49 |
| 5,880,942 | A * | 3/1999 | Leu | 363/49 |
| 5,982,639 | A | 11/1999 | Balakrishnan | |
| 6,005,781 | A | 12/1999 | Balakrishnan | |
| 6,107,851 | A | 8/2000 | Balakrishnan et al. | |
| 6,125,046 | A | 9/2000 | Jang et al. | |
| 6,166,926 | A * | 12/2000 | Nath et al. | 363/21.03 |
| 6,226,190 | B1 | 5/2001 | Balakrishnan et al. | |
| 6,229,366 | B1 | 5/2001 | Balakrishnan et al. | |
| 6,233,165 | B1 | 5/2001 | Irissou et al. | |
| 6,285,569 | B1 | 9/2001 | Hall et al. | |
| 6,297,623 | B1 | 10/2001 | Balakrishnan et al. | |
| 6,301,135 | B1 | 10/2001 | Mammano et al. | |
| 6,316,922 | B1 | 11/2001 | Sugahara et al. | |
| 6,324,079 | B1 | 11/2001 | Collmeyer et al. | |
| 6,407,603 | B2 | 6/2002 | Bendall | |
| 6,414,471 | B1 | 7/2002 | Balakrishnan et al. | |
| 6,441,652 | B1 | 8/2002 | Qian | |
| 6,456,511 | B1 * | 9/2002 | Wong | 363/21.13 |
| 6,504,352 | B2 | 1/2003 | Halberstadt | |
| 6,549,430 | B1 | 4/2003 | Hosotani et al. | |
| 6,577,509 | B2 | 6/2003 | Deboy et al. | |
| 6,587,357 | B1 | 7/2003 | Halamik et al. | |
| 6,608,471 | B2 | 8/2003 | Balakrishnan et al. | |
| 6,643,144 | B2 | 11/2003 | Feldtkeller | |
| 6,747,444 | B2 | 6/2004 | Balakrishnan et al. | |
| 6,775,164 | B2 * | 8/2004 | Wong et al. | 363/147 |
| 6,804,126 | B2 * | 10/2004 | Lucas | 363/21.01 |
| 6,807,075 | B2 | 10/2004 | Miermans | |
| 6,865,093 | B2 | 3/2005 | Disney | |
| 6,876,181 | B1 | 4/2005 | Balakrishnan et al. | |
| 6,906,934 | B2 | 6/2005 | Yang et al. | |
| 6,940,320 | B2 | 9/2005 | Sukup et al. | |
| 6,972,971 | B2 | 12/2005 | Jang et al. | |
| 7,002,398 | B2 | 2/2006 | Disney | |
| 7,038,439 | B2 | 5/2006 | Balakrishnan et al. | |
| 7,099,163 | B1 | 8/2006 | Ying | |
| 7,102,900 | B2 | 9/2006 | Disney | |
| 7,205,824 | B2 | 4/2007 | Disney | |
| 7,215,105 | B2 | 5/2007 | Balakrishnan et al. | |
| 7,233,504 | B2 | 6/2007 | Djenguerian et al. | |
| 7,248,029 | B2 | 7/2007 | Balakrishnan et al. | |
| 7,333,351 | B2 | 2/2008 | Disney | |
| 7,365,996 | B2 | 4/2008 | Schonleitner et al. | |
| 7,430,131 | B2 * | 9/2008 | Grasso et al. | 363/49 |
| 7,443,153 | B2 | 10/2008 | Mayel | |
| 7,477,534 | B2 | 1/2009 | Balakrishnan et al. | |
| 7,486,529 | B2 | 2/2009 | Sukup | |
| 7,491,611 | B2 | 2/2009 | Disney | |
| 7,502,236 | B2 | 3/2009 | Baurle et al. | |
| 7,518,885 | B2 | 4/2009 | Baurle et al. | |
| 7,576,528 | B2 | 8/2009 | Wang et al. | |
| 7,619,450 | B2 | 11/2009 | Grasso et al. | |
| 7,626,373 | B2 | 12/2009 | Mayell | |
| 7,636,247 | B2 | 12/2009 | Disney | |
| 7,646,184 | B2 | 1/2010 | Balakrishnan et al. | |
| 7,696,566 | B2 | 4/2010 | Disney | |
| 7,701,186 | B2 | 4/2010 | Balakrishnan et al. | |
| 7,719,243 | B1 | 5/2010 | Balogh | |
| 7,723,972 | B1 | 5/2010 | Balogh | |
| 7,755,917 | B2 | 7/2010 | Djenguerian et al. | |
| 7,830,678 | B2 | 11/2010 | Djenguerian et al. | |
| 7,834,605 | B2 | 11/2010 | Balakrishnan et al. | |
| 7,852,648 | B2 | 12/2010 | Cho | |
| 7,872,304 | B2 | 1/2011 | Disney | |
| 7,872,883 | B1 | 1/2011 | Elbanhawy | |
| 7,904,738 | B2 | 3/2011 | DuBose | |
| 7,908,498 | B2 | 3/2011 | DuBose | |
| 7,948,780 | B2 | 5/2011 | Sonobe | |
| 7,952,895 | B2 | 5/2011 | Matthews | |
| 7,964,994 | B2 | 6/2011 | DuBose et al. | |
| 7,964,995 | B2 | 6/2011 | DuBose et al. | |
| 7,974,112 | B2 | 7/2011 | Balakrishnan et al. | |
| 7,977,823 | B2 | 7/2011 | DuBose et al. | |
| 7,995,359 | B2 | 8/2011 | Djenguerian et al. | |
| 8,000,114 | B2 | 8/2011 | Baurle et al. | |
| 8,004,864 | B2 | 8/2011 | Wang et al. | |
| 8,427,849 | B2 * | 4/2013 | Asinovski et al. | 363/49 |
| 8,629,631 | B1 * | 1/2014 | Rhodes et al. | 315/307 |
| 2002/0018352 | A1 * | 2/2002 | L'Hermite et al. | 363/41 |
| 2002/0130645 | A1 * | 9/2002 | Tsai et al. | 323/274 |
| 2005/0077551 | A1 | 4/2005 | Halamik et al. | |
| 2006/0044845 | A1 | 3/2006 | Fahlenkamp et al. | |
| 2008/0117653 | A1 | 5/2008 | Saito | |
| 2008/0246450 | A1 * | 10/2008 | Matyas et al. | 323/238 |
| 2010/0259952 | A1 * | 10/2010 | Zhu et al. | 363/20 |
| 2011/0157919 | A1 * | 6/2011 | Yedevelly et al. | 363/20 |
| 2011/0157941 | A1 | 6/2011 | Yedevelly et al. | |
| 2011/0182088 | A1 * | 7/2011 | Lidak et al. | 363/21.12 |
| 2011/0309810 | A1 * | 12/2011 | Willmeroth et al. | 323/282 |
| 2012/0281440 | A1 * | 11/2012 | Hayashi et al. | 363/21.15 |
| 2012/0320640 | A1 * | 12/2012 | Baurle et al. | 363/21.17 |

OTHER PUBLICATIONS

Lei, Jimes, "Efficient Switchmode Power Supply Start-Up Circuit," Supertex Inc. Application Note AN-D25, Apr. 1, 2009, pp. 1-5.

O'Loughlin, Michael, "A Better Bootstrap/Bias Supply Circuit," Texas Instruments Inc. Power Management, Analog Applications Journal, Analog and Mixed-Signal Products, URL: <www.ti.com/sc/analogapps> Oct. 2005, 3 pages.

Supertex Inc., "High Input Voltage SMPS Start-up Circuit," LR745 Datasheet, Nov. 12, 2001, 5 pages.

* cited by examiner

SWITCHED-MODE POWER SUPPLY STARTUP CIRCUIT, METHOD, AND SYSTEM INCORPORATING SAME

CROSS-REFERENCE TO RELATED APPLICATION

This application claims the benefit under 35 U.S.C. §119 (e) of U.S. Provisional Application No. 61/563,198, filed Nov. 23, 2011, entitled "Switched-Mode Power Supply Startup Circuit, Method, and System Incorporating Same" by Zahid Ansari, which application is hereby incorporated by reference in its entirety.

COPYRIGHT NOTICE

A portion of the disclosure of this patent document, including the Computer Program Listing, contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND

1. Field of the Invention

The present invention relates generally to switched-mode power supply circuits, and more particularly to startup circuits for such switched-mode power supply circuits.

2. Description of the Related Art

Electronic products usually require power supply systems that take power from a high-voltage source and deliver regulated power either directly to the product or to a battery that serves as the source of power for the product. Today, these power supplies are typically switched-mode power supply (SMPS) circuits. These SMPS systems generally incorporate an integrated circuit (IC) which controls the regulation of the delivered power by switching one or more transistors connected to a transformer or inductor. These SMPS Control IC's are generally designed so that when they are operating and delivering power to the load, they simultaneously deliver power to the IC itself. This is done to reduce power loss and improve the efficiency of the system, by powering the SMPS Control IC off a low-voltage source rather than off a high-voltage source. Since the low-voltage source is generated by the SMPS Control IC, it is not available until the SMPS Control IC starts to switch the transformer or inductor. This results in the common need for a startup circuit (sometimes called a "bootstrap" circuit) as a mechanism to deliver startup current to the SMPS Control IC directly from the high-voltage source until the SMPS Control IC starts to operate or "wakes up". To reduce the amount of power directly required from the high-voltage source, SMPS Control IC's are usually designed to have very low current consumption until they wake up and start delivering power to themselves. This is often referred to as the SMPS Control IC having a sleep current consumption that is much lower than the operating current consumption.

The simplest and lowest cost startup circuit is a resistor between the high-voltage source and the power supply or VDD pin of the SMPS Control IC. This resistor has the following two key disadvantages: the startup current depends on the voltage of the high-voltage source; and the startup circuit is a source of continuous power loss.

The prior art includes a variety of circuits in which transistors are connected between the high-voltage source and the VDD pin of the SMPS Control IC, and these transistors are switched off once the SMPS Control IC is operational.

SUMMARY OF EMBODIMENTS OF THE INVENTION

The prior art startup techniques disconnect the startup current once the SMPS Control IC "wakes up" by using either a signal generated by logic in the SMPS Control IC, or by detecting the VDD voltage relative to the SMPS Control IC ground pin. This results in distinct solutions for different SMPS Control IC's, and perhaps for different SMPS topologies, to match the wake-up and sleep voltages of specific SMPS Control IC's, and/or requires one or more logic signals from the SMPS Control IC (requiring one or more package pins) to disconnect the current source.

However, there are two useful characteristics found in virtually all SMPS systems: (1) SMPS Control IC's are designed to consume less current prior to starting (before "waking up"); and (2) a number of accessible nodes in the SMPS system (i.e., external to the SMPS Control IC) are static until the control IC starts, then exhibit an time-varying voltage waveform when the SMPS Control IC starts switching the transformer or inductor used as the energy storage element in the SMPS system. Such a time-varying waveform, or increased current consumption by the SMPS Control IC, may be detected without requiring any ground reference to the SMPS Control IC, nor without requiring any logic signals generated by the SMPS Control IC, to then disconnect the startup current. This provides for rapid and predictable startup of an SMPS Control IC and reduced power loss once the SMPS Control IC is operational, and is independent of the operating voltages of the SMPS Control IC, and independent of the particular control scheme and switch topology of the SMPS system.

Disconnection of the startup current may be triggered, for example, by detecting flow of current from the transformer or inductor to the SMPS Control IC, by detecting voltage transitions on nodes of the transformer or inductor, by detecting transitions on nodes of the transistor driving the transformer or inductor, or by detecting a time-varying waveform on another observable node. In some embodiments, the startup current may be automatically reconnected when no triggers are detected for a period of time (determined by design parameters of the startup circuit), resulting in automatic restarting of the SMPS system without disconnection of the power source. In some embodiments, a memory element may be incorporated in the startup circuit, to thereby require disconnection of the power source before the SMPS system will restart.

Certain embodiments provide a startup circuit for a switched-mode power supply. An exemplary startup circuit includes: a voltage input node; an output current node; a disable input node; a startup current circuit configured to provide a startup current from the voltage input node to the output current node when enabled, and to block the startup current when disabled; and a control circuit configured to enable the startup current circuit when a voltage is first applied to the voltage input node, and to disable the startup current circuit in response to one or more voltage excursions on the disable input node which exceed by a first offset a voltage of the output current node.

In some embodiments, the control circuit draws a standby current that is less than 1% of the startup current. In some embodiments, the first offset is within the range of 10-500 mV. In some embodiments, the first offset is predetermined at manufacture of the startup circuit. In some embodiments, the first offset is determined by one or more external components coupled to the startup circuit. In some embodiments, the control circuit is configured to disable the startup current circuit in response to a certain number of said voltage excursions.

In some embodiments, the control circuit is configured to disable the startup current circuit after a certain delay in response to said one or more voltage excursions. In some embodiments, the certain delay is predetermined at manufacture of the startup circuit. In some embodiments, the certain delay is determined by one or more external components coupled to the startup circuit.

In some embodiments, the control circuit is configured to re-enable the startup current circuit after an absence, for a first duration, of a voltage excursion on the disable input node. In some embodiments, the first duration is predetermined at manufacture of the startup circuit. In some embodiments, the first duration is determined by one or more external components coupled to the startup circuit.

In some embodiments, the startup current circuit is configured to provide a controlled startup current that is substantially constant in magnitude irrespective of the voltage difference between the voltage input node and the output current node. In some embodiments, the startup current circuit includes a normally-on transistor coupled between the voltage input node and a first node, having a gate terminal coupled to the output current node. The startup current circuit further includes a resistor coupled between the first node and a second node, and a transistor switch device coupled between the second node and the output current node, having a control terminal coupled to an output node of the control circuit.

In some embodiments, the control circuit includes an input circuit having an input coupled to the disable input node. The input circuit is configured to generate on an output node thereof an asymmetric signal relative to a signal coupled to its input node. The control circuit further includes a comparator circuit having a first input coupled to the input circuit output node, having a second input coupled to the output current node, and having an output coupled to an enable input for the startup current circuit. The comparator circuit is configured to disable the startup current circuit when a voltage of the first input exceeds a voltage of the second input by a second offset.

In some embodiments, the control circuit further includes a latch circuit configured so that the startup current circuit, once disabled by the comparator circuit, remains disabled even in an absence of voltage excursions on the disable input node. In some embodiments, the second offset is within the range of 10-500 mV.

Another exemplary startup circuit includes: a voltage input node; an output current node; a disable input node; a startup current circuit configured to provide a startup current from the voltage input node to the output current node when enabled, and to block the startup current when disabled; and means for enabling the startup current circuit when a voltage is first applied to the voltage input node, and for disabling the startup current circuit after a voltage conveyed to the disable input node exceeds by a first offset a voltage of the output current node.

Certain embodiments provide a switched-mode power supply circuit which includes a startup circuit. In some embodiments, the startup circuit includes an integrated circuit, and the first offset is determined by one or more external components coupled to the startup circuit. In some embodiments, the switched-mode power supply circuit also includes a switched-mode control circuit having a power supply terminal and a ground terminal, which is configured when operational to pulse current through a coil of an energy storage transformer or inductor of the SMPS circuit; and also includes means for generating voltage excursions on the disable input node in response to said current pulses through said coil.

In some embodiments, the means for generating includes a coupling capacitor disposed between the disable input node and another node that exhibits a time-varying voltage waveform when the switched-mode control circuit is operational.

In some embodiments, the means for generating includes a direct connection from the disable input node to another node that exhibits a time-varying voltage waveform having voltage excursions that exceed the voltage of the output current node when the switched-mode control circuit is operational.

Certain embodiments provide a computer-readable storage medium including data structures encoding an aspect of such a startup circuit.

Certain embodiments provide a method for starting up a switched-mode power supply (SMPS) circuit. An exemplary method includes: providing a startup current to a power supply terminal of a switched-mode control circuit to thereby develop an increasing voltage on the power supply terminal; generating on a disable node a voltage excursion exceeding by a first offset the voltage of the power supply terminal when the switched-mode control circuit begins to operate; and disabling the startup current provided to the power supply terminal in response to detecting the voltage excursion on the disable node.

In some embodiments, the method also includes re-enabling the startup current provided to the power supply terminal upon detecting an absence, for a first duration, of a voltage excursion on the disable node. In some embodiments, the startup current provided to the power supply terminal is substantially a constant current irrespective of the magnitude of an input voltage provided to the SMPS circuit. In some embodiments, the first offset is within the range of 10-500 mV.

In some embodiments, the method also includes generating a respective voltage excursion on the disable node for each respective current pulse through a coil of an energy storage transformer or inductor of the SMPS circuit, each respective voltage excursion exceeding by the first offset the voltage of the power supply terminal. In some embodiments, the voltage excursion on the disable node constantly exceeds by the first offset the voltage of the power supply terminal so long as the switched-mode control circuit continues to operate.

Certain embodiments provide a method for making a startup circuit product for a switched-mode power supply. An exemplary method includes: providing a voltage input node; providing an output current node; providing a disable input node; providing a startup current circuit configured to provide a startup current from the voltage input node to the output current node when enabled, and to block the startup current when disabled; and providing a control circuit configured to enable the startup current circuit when a voltage is first applied to the voltage input node, and to disable the startup current circuit after a voltage conveyed to the disable input node exceeds by a first offset a voltage of the output current node.

The inventive aspects described herein are specifically contemplated to be used alone as well as in various combinations. The invention in several aspects is contemplated to include circuits (including integrated circuits), related methods of operation, methods for making such circuits, systems incorporating same, and computer-readable storage media encodings of such circuits and methods and systems, various embodiments of which being described herein in greater detail, and as set forth in the appended claims.

The foregoing is a summary and thus contains, by necessity, simplifications, generalizations and omissions of detail. Consequently, those skilled in the art will appreciate that the foregoing summary is illustrative only and is not intended to be in any way limiting of the invention. It is only the claims, including all equivalents, in this or any non-provisional application claiming priority to this application, that are intended to define the scope of the invention(s) supported by this application.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
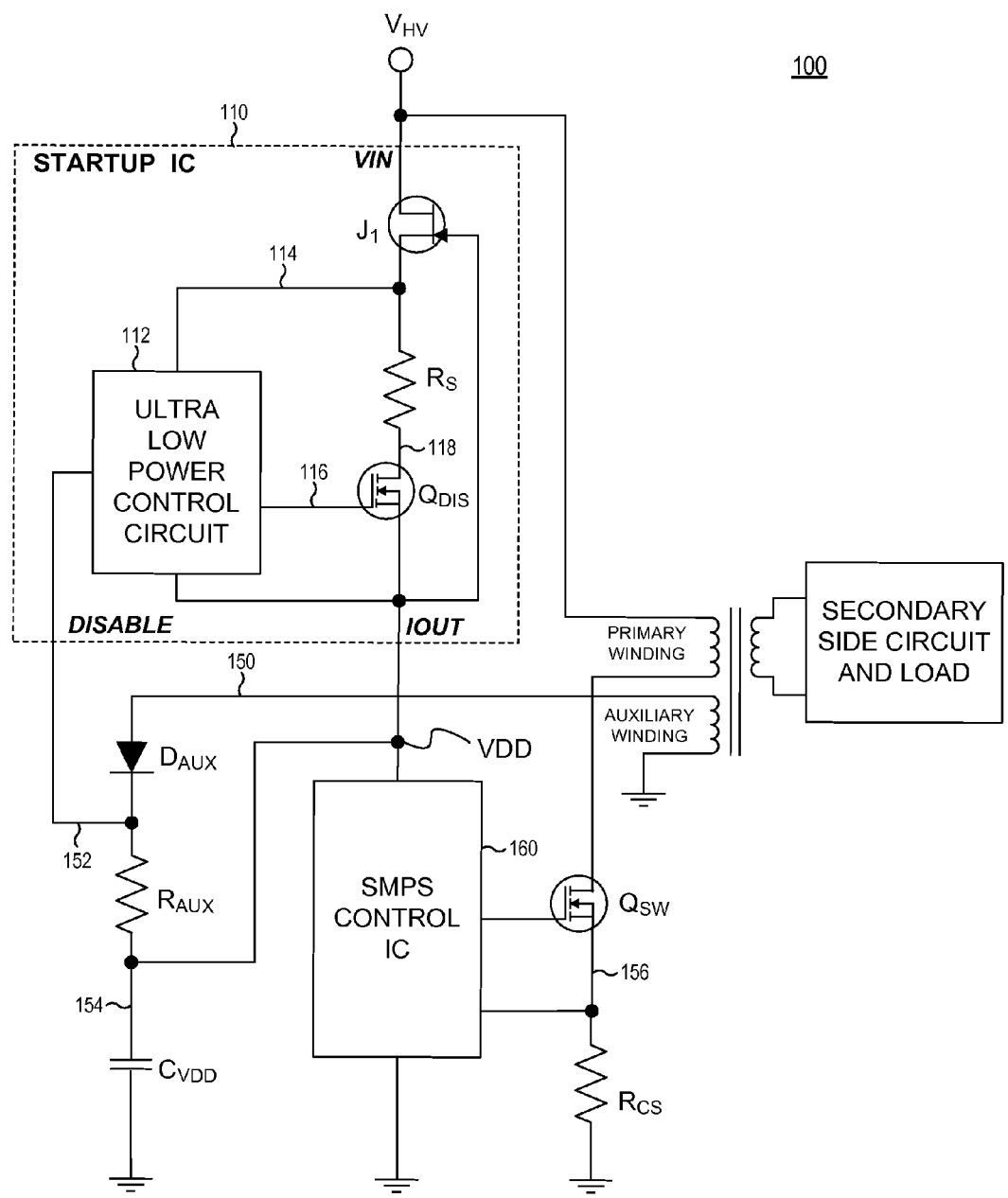
FIG. 1 is a schematic diagram of an exemplary configuration of a SMPS circuit.

Referring now to FIG. 1, a simplified schematic diagram is shown of an exemplary SMPS system 100. A Startup IC 110 is preferably implemented as an integrated circuit incorporating a normally-on transistor and additional circuitry that is connected between a high-voltage power source $V_{HV}$ and the power pin 154 (VDD pin) of the SMPS Control IC 160. However, such a startup circuit 110 may also be implemented using discrete components, or may be implemented as a portion of another integrated circuit (e.g., SMPS Control IC). The high-voltage power source $V_{HV}$ may correspond to an input node for a DC-to-DC converter circuit, and may correspond to a full-wave rectified voltage node for an AC-to-DC converter circuit.

When power is first connected to the SMPS system input, the high-voltage power source $V_{HV}$ rises from zero volts, and regulated current is delivered from the high-voltage power source to the pin 154 of the SMPS Control IC 160, which charges the capacitor $C_{VDD}$. When the voltage on node 154 reaches the operating voltage of the SMPS Control IC 160, the Startup IC 110 detects the operation of the SMPS Control IC 160 and disconnects the startup current source.

In this configuration, the Startup IC 110 detects operation of the SMPS Control IC 160 by sensing flow of current in a resistor $R_{AUX}$ coupled between the auxiliary winding of the SMPS transformer and the VDD pin 154 of the SMPS Control IC 160. Until the SMPS Control IC starts operation, there is no voltage across the auxiliary winding so the auxiliary diode $D_{AUX}$ is off (i.e. reverse biased), and the Startup IC 110 delivers regulated current to the VDD pin 154 through $J_1$, $R_S$ and $Q_{DIS}$. The startup current is limited by the threshold voltage of the normally-on transistor $J_1$ and the source resistor $R_S$, and is largely independent of the voltage value of the high-voltage source. When the voltage on the VDD pin 154 exceeds the minimum operating voltage of the SMPS Control IC 160, the SMPS Control IC 160 begins operation (i.e., pulsing transistor $Q_{SW}$ on/off), and the node of the auxiliary winding connected to $D_{AUX}$ (node 150) has both positive and negative voltage pulses with respect to ground. The transformer is designed so that the positive voltage pulses rise sufficiently above node 154 to forward bias $D_{AUX}$ and thereby deliver power through the $R_{AUX}$ resistor to the VDD capacitor and VDD pin 154 of the SMPS Control IC 160.

When such a positive current pulse occurs in $R_{AUX}$, the voltage on the DISABLE pin of the Startup IC 110 exceeds the voltage on the IOUT pin of the Startup IC 110 (i.e., the voltage of node 152 is positive relative to the voltage of node 154). The Startup IC 110 thus detects this positive current pulse in $R_{AUX}$ and disconnects the startup current by switching off the transistor $Q_{DIS}$. The ultra-low-power control circuit 112 within the Startup IC 110 continues to power itself through $J_1$, but power loss is minimal since it is designed to have current consumption that is very low in comparison with the startup current through $R_S$ and $Q_{DIS}$. The resistor $R_S$ also serves the secondary function of ensuring that there is adequate voltage across the ultra-low-power control circuit 112 to ensure normal operation during startup mode when $Q_{DIS}$ is on.

In some embodiments, the response time of the ultra-low-power control circuit 112 is preferably designed to ensure that $Q_{DIS}$ does not get turned back on unless there has been an absence of current pulses in $R_{AUX}$ for a time period that is long relative to the minimum operating frequency of the SMPS system. This also results in automatic reconnection of the startup current and automatic restart of the SMPS if there have been no pulses detected for a period of time and there is still voltage on the high-voltage source.

If the peak voltage across the $R_{AUX}$ resistor is too large, external resistors may be used to attenuate the signal. In some embodiments, the $R_{AUX}$ resistor may be incorporated into the Startup IC. In some embodiments, the $Q_{SW}$ transistor may be implemented as a bipolar junction transistor instead of an NMOS transistor as shown.

Figure 2:
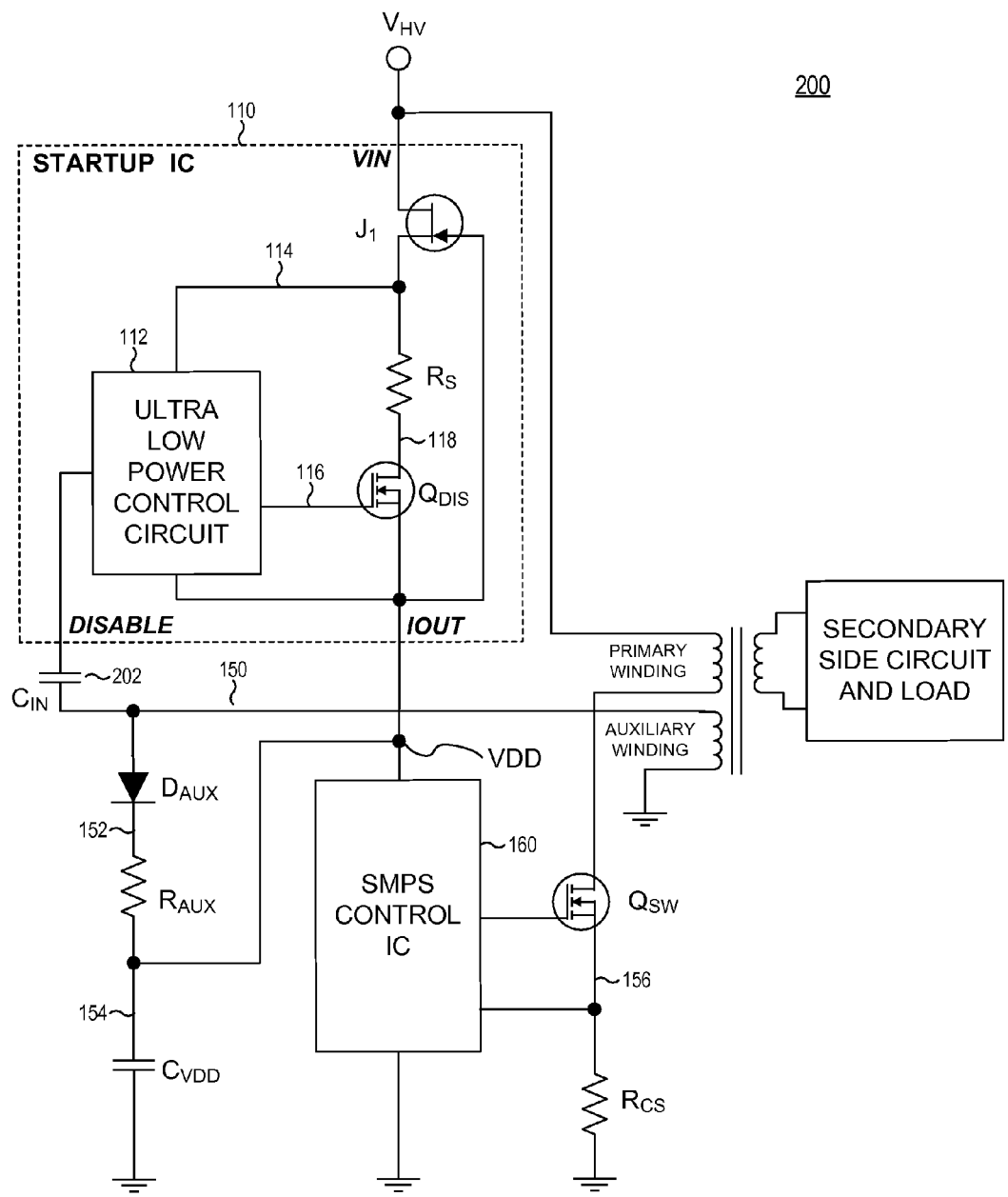
FIG. 2 is a schematic diagram of an exemplary configuration of a SMPS circuit.

In the configuration shown in FIG. 2, the Startup IC 110 detects operation of the IC by sensing voltage transitions on the auxiliary winding of the SMPS transformer. Until the SMPS Control IC 160 starts operation, there is no voltage across the auxiliary winding, and the Startup IC 110 delivers regulated current to the VDD pin 154 through $J_1$, $R_S$ and $Q_{DIS}$. The startup current is limited by the threshold voltage of the normally-on transistor $J_1$ and the source resistor $R_S$, and is largely independent of the value of the high-voltage source. When the voltage on node 154 exceeds the minimum operating voltage of the SMPS Control IC 160, the SMPS Control IC 160 begins operation, and the node 150 of the auxiliary winding connected to $D_{AUX}$ has both positive and negative voltage pulses with respect to ground. This node is capacitively coupled to the DISABLE input of the Startup IC 110. The capacitive coupling scheme makes the method independent of the absolute values of voltages on the transformer. The coupling capacitor 202 may be implemented using a small-value, low-voltage capacitor.

When a positive voltage pulse on the DISABLE input is detected, the Startup IC 110 disconnects the startup current by switching off the transistor $Q_{DIS}$. As before, the ultra-low-power control circuit 112 within the Startup IC continues to power itself through $J_1$, but power loss is minimal since it is designed to have current consumption that is very low in comparison with the startup current through $R_S$ and $Q_{DIS}$. The resistor $R_S$ also serves the secondary function of ensuring that there is adequate voltage across the ultra-low-power control circuit 112 to ensure normal operation during startup mode when $Q_{DIS}$ is on.

In some embodiments, the response time of the ultra-low-power control circuit 112 is preferably designed to ensure that $Q_{DIS}$ does not get turned back on unless there has been an absence of voltage pulses on the auxiliary winding for a time period that is long relative to the minimum operating frequency of the SMPS system. This also results in automatic reconnection of the startup current and automatic restart of the SMPS if there have been no pulses detected for a period of time and there is still voltage on the high-voltage source.

The DISABLE input may be capacitively coupled from an Auxiliary or Feedback winding on the transformer, or may be capacitively coupled from another available node that exhibits a time-varying voltage when the SMPS Control IC 160 is operating, but exhibits a static voltage when not operating. Such a time-varying voltage may, but need not, be a sinusoidal voltage waveform, but also can be any non-static voltage waveform (e.g., a 10% duty cycle positive pulse on a signal whose voltage otherwise is at ground).

Figure 3:
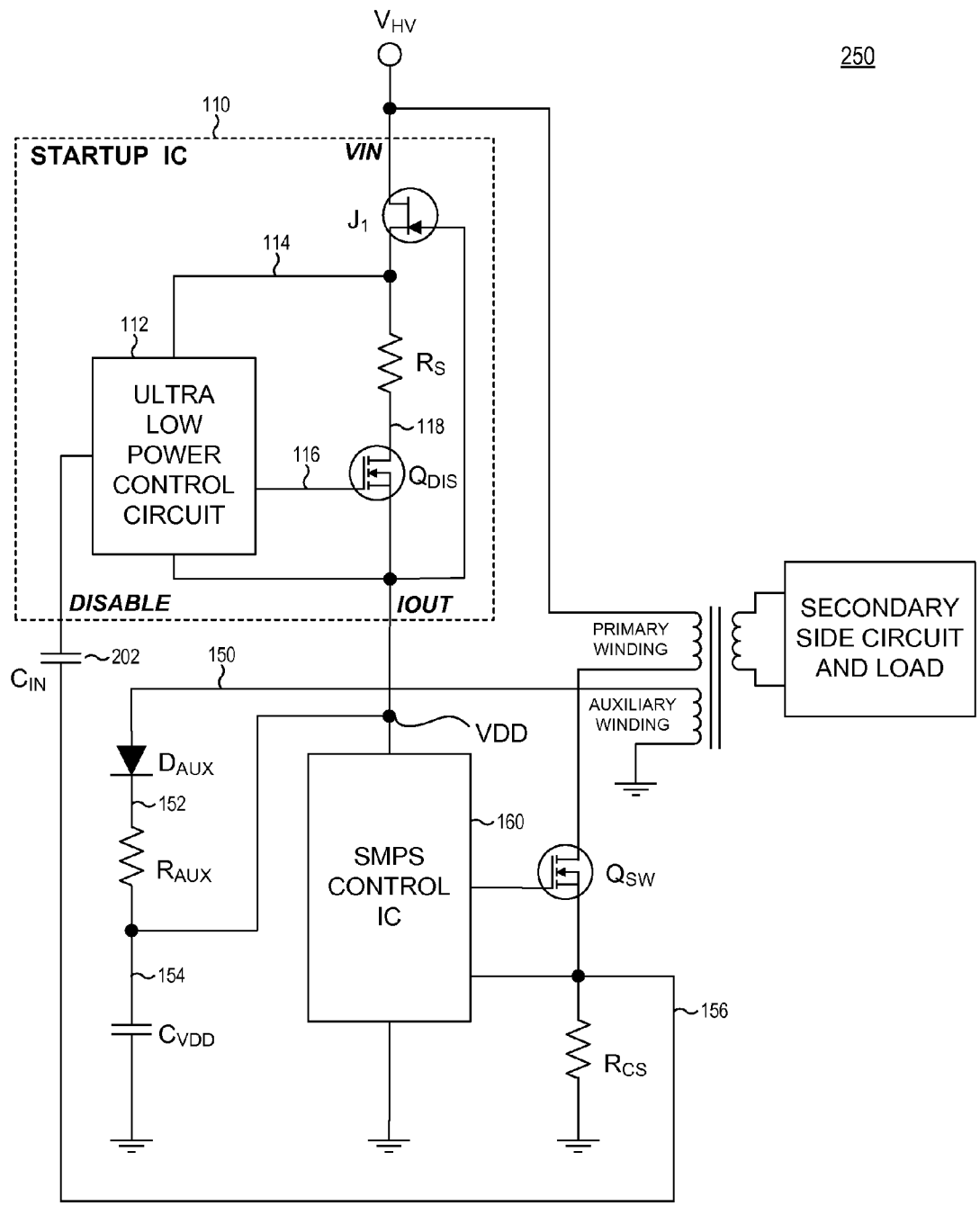
FIG. 3 is a schematic diagram of an exemplary configuration of a SMPS circuit.

Another exemplary configuration is shown in FIG. 3. In this configuration, the Startup IC 110 detects operation of the IC by sensing voltage transitions on the SMPS current sense resistor, $R_{CS}$, which transitions are capacitively coupled to the DISABLE input. Until the SMPS Control IC 110 starts operation, there is no voltage across $R_{CS}$, and the Startup IC delivers regulated current to the VDD pin 154 through $J_1$, $R_S$ and $Q_{DIS}$. The startup current is limited by the threshold voltage of the normally-on transistor $J_1$ and the source resistor $R_S$, and is largely independent of the value of the high-voltage source. When the SMPS Control IC 160 begins operation, the voltage across $R_{CS}$ rises and falls on every switching cycle in proportion to the current in the transistor $Q_{SW}$. These voltage transitions on node 156 are capacitively coupled to the DISABLE input of the Startup IC 110, which causes a corresponding voltage excursion above the voltage of the VDD pin 154 (which is coupled to the IOUT pin) for each voltage transition on node 156. The coupling capacitor 202 may be implemented using a small-value, low-voltage capacitor. Because the current sense resistor $R_{CS}$ is typically a low value resistor, the small incremental capacitance of the coupling capacitor 202 has a negligible effect on node 156.

When a positive voltage pulse is detected, the Startup IC 110 disconnects the startup current by switching off the transistor $Q_{DIS}$. The ultra-low-power control circuit 112 within the Startup IC continues to power itself through $J_1$, but power loss is minimal since it is designed to have current consumption that is very low in comparison with the startup current through $R_S$ and $Q_{DIS}$. The resistor $R_S$ also serves the secondary function of ensuring that there is adequate voltage across the ultra-low-power control circuit 112 to ensure normal operation during startup mode when $Q_{DIS}$ is on.

In some embodiments, the response time of the ultra-low-power control circuit 112 is preferably designed to ensure that $Q_{DIS}$ does not get turned back on unless there has been an absence of voltage pulses on the current sense resistor $R_{CS}$ for a time period that is long relative to the minimum operating frequency of the SMPS system. This also results in automatic reconnection of the startup current and automatic restart of the SMPS if there have been no pulses detected for a period of time and there is still voltage on the high-voltage source. The capacitive coupling scheme makes the method independent of the absolute values of currents in the application.

In each of the embodiments described in FIGS. 1, 2, and 3, the Startup IC 110 is not referenced to the ground of the SMPS Control IC, and is therefore independent of the voltage required on the VDD pin 154 for normal operation of the SMPS Control IC. As a result, each of the embodiments is compatible with a broad range of control IC's and power conversion systems. In each such configuration, a voltage excursion is generated on the DISABLE pin when the SMPS Control IC 160 begins operation, which voltage excursion exceeds the voltage of the IOUT pin.

Figure 4:
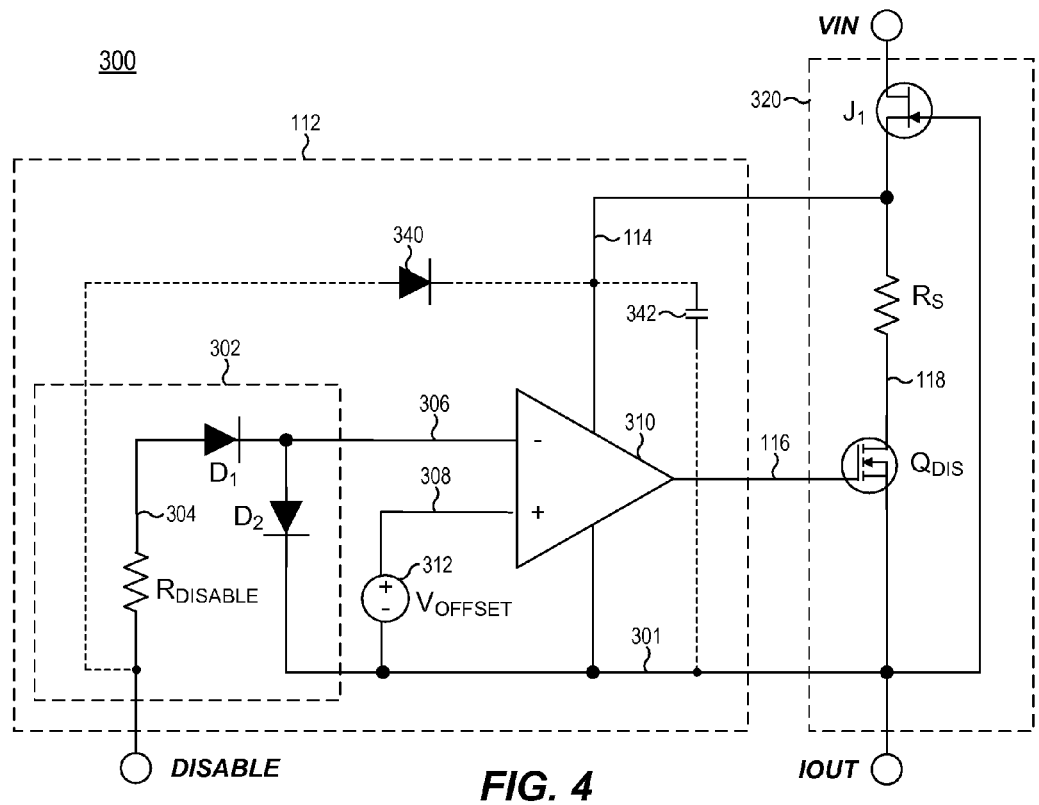
FIG. 4 is a schematic diagram of an exemplary configuration of a startup circuit shown in previous figures.

Referring now to FIG. 4, a block diagram is shown for an exemplary implementation 300 of the Startup IC which delivers a regulated startup current to the IOUT pin (node 301) through $J_1$, $R_S$ and $Q_{DIS}$ which together may be viewed as a startup current circuit 320. The magnitude of the startup current is limited by the threshold voltage of the normally-on JFET transistor $J_1$ and the source resistor $R_S$, and is largely independent of the voltage value of the high-voltage source. A useful value of such a startup current is approximately 1 mA, but other values may be chosen depending upon the needs of the specific SMPS circuit.

In some embodiments, $J_1$ may be implemented using a depletion-mode MOS transistor and likewise achieve a substantially constant current largely independent of the voltage value of the high-voltage source. Both a JFET and a depletion-mode MOSFET may be viewed as "normally-on transistors" since both have a negative threshold voltage. In other embodiments in which a substantially constant current is not a high priority, the startup current circuit 320 may omit $J_1$ and instead include one or more resistors.

When the voltage on the DISABLE pin of the Startup IC exceeds the voltage on the IOUT pin of the Startup IC by a certain amount, the comparator detects this and disables (i.e., disconnects) the startup current by switching off the transistor $Q_{DIS}$. The ultra-low-power control circuit 112 continues to power itself through $J_1$, but power loss is minimal since it is designed to have current consumption that is very low in comparison with the startup current through $R_S$ and $Q_{DIS}$. Preferably such steady-state standby current is less than 250 nA to provide a standby power dissipation less than approximately 90 μW (corresponding to an input voltage of 373 VDC). Also, such steady-state standby current is preferably less than 5% of the startup current, and more preferably less than 1% of the startup current, and even more preferably less than 0.1% of the startup current, depending upon the requirements of a given SMPS application. The resistor $R_S$ also serves the secondary function of ensuring that there is adequate voltage across the comparator to ensure normal operation during startup mode when $Q_{DIS}$ is on.

As described thus far, the steady-state standby current is sourced by the voltage coupled to the VIN pin. In certain embodiments, the steady-state standby current that is drawn from the VIN pin may be reduced by drawing power from the voltage excursions coupled to the DISABLE pin, and coupling this additional power to the comparator 310. For example, an optional diode 340 (whose connections are shown as dotted lines) that is forward biased from the DISABLE pin to node 114 may be provided. If the voltage excursions on the DISABLE pin are sufficiently above the IOUT voltage, this diode 340 may drive the voltage on node 114 to a value that is higher than the threshold voltage of $J_1$ (relative to the IOUT voltage), thereby turning off transistor $J_1$ and sourcing the entire steady-state standby current from the DISABLE pin. An optional filtering capacitor 342 (whose connections are also shown as dotted lines) between node 114 and node 301 may also be included to provide a more constant voltage on node 114.

Although shown here as being an enhancement-mode NMOS transistor, in other embodiments $Q_{DIS}$ may be implemented using a bipolar junction transistor, although this would require a higher drive capability by the comparator output to achieve a given startup current.

The diodes $D_1$ and $D_2$ provide an asymmetric response to voltage transients on the DISABLE input to ensure proper operation at light load conditions (or "no load" conditions) of the power supply when the SMPS duty cycle is very low. The input resistor $R_{DISABLE}$ provides current limiting on the input stage to ensure proper operation over a wide range of the differential voltage between DISABLE and IOUT. The resistor $R_{DISABLE}$ and diodes $D_1$ and $D_2$ may be viewed as forming an input circuit 302 that is responsive to the DISABLE input and generates an output signal on output node 306, which output is coupled to the inverting input of comparator 310.

At low forward voltages, the forward current through diodes $D_1$ and $D_2$ may be in the nano-Amp range, but diodes $D_1$ and $D_2$ also function as a capacitive divider to couple a voltage onto output node 306 that is approximately half of the voltage transition on node 304 (assuming $D_1$ and $D_2$ are identical and the input capacitance of comparator 310 is negligible). At larger voltages on node 304, the forward voltage across diodes $D_1$ and $D_2$ corresponds to a much larger forward current through the diodes.

In some embodiments, the comparator 310 preferably includes a built-in offset voltage to ensure that the transistor $Q_{DIS}$ is in the on state for zero voltage between DISABLE and IOUT. This offset voltage is indicated as a $V_{OFFSET}$ voltage 312 coupled to the non-inverting input of the comparator 310. In some embodiments the offset voltage may be generated by a reference circuit and the comparator 310 implemented without a built-in offset. In some embodiments, the comparator 310 is preferably designed to have substantially uniform operating current and performance over a wide range of operating voltages that may be generated at node 114.

The input circuit 302 attenuates a positive excursion on the DISABLE node to generate the signal on its output node 306. This attenuation and the comparator offset 312 together determine an effective offset for the Startup IC 300. However, other input circuits are contemplated that, when combined with a suitable comparator (with or without a separate comparator offset), can detect if a voltage conveyed to the DISABLE input exceeds by the effective offset the voltage of the IOUT node. In some embodiments the magnitude of this effective offset may be determined at manufacture, such as by proper selection of internal component values within the Startup IC. In some embodiments the magnitude of this effective offset may be determined by one or more external components coupled to the Startup IC.

In some embodiments, the response time of the ultra-low-power control circuit 112 is preferably designed to ensure that $Q_{DIS}$ does not get turned back on unless there has been an absence of voltage pulses on the auxiliary winding for a time period that is long relative to the minimum operating frequency of the SMPS system. This also results in automatic reconnection of the startup current and automatic restart of the SMPS if there have been no pulses detected on the DISABLE input for a period of time and there is still voltage on the high-voltage source.

A variety of other input circuits may also be incorporated that are suitable for use. Generally, such input circuits serve to transform the voltage and time characteristics of the voltage signal coupled to the DISABLE input, to an output signal having voltage and time characteristics that are compatible with an input of a low current comparator. Exemplary input circuits may attenuate the voltage of the DISABLE input and present a much lower voltage output signal to the comparator, to thereby provide for large signal voltage excursions on the DISABLE input without overdriving the comparator. Conversely, other exemplary input circuits may amplify the voltage of the DISABLE input and present a higher voltage output signal to the comparator. As described above, exemplary input circuits may provide an asymmetric response to voltage transients on the DISABLE input. The output may be configured to respond quickly to a narrow voltage excursion pulse, and to respond more slowly to an absence of a voltage excursion pulse (or a continued absence of excursions). Such response times may be predetermined at manufacture, or may be determined by one or more external components coupled to the Startup IC.

The overall response time and offset voltage of the ultra-low-power control circuit 112 may be largely determined by the input circuit or the comparator acting alone, or determined by both such circuits acting cooperatively. For example, rather than an input circuit whose output is asymmetrical in response to narrow voltage pulses on the DISABLE input, a comparator may be provided having a switching skew (i.e., an asymmetrical timing delay) so that its output switches quickly to disable the startup current circuit (i.e., after detecting one or more voltage excursions on the DISABLE input), but whose output switches much more slowly to re-enable the startup current circuit in the absence of voltage excursions on the DISABLE input. Such overall characteristics of the control circuit 112, including the overall turn-on and turn-off delays and effective offset voltage, may be predetermined at manufacture, or may be determined by one or more external components coupled to the Startup IC.

As may be appreciated from the above, the ultra-low-power control circuit 112 may be configured to disable the startup current circuit 320 in response to one or more voltage excursions on the DISABLE input which exceed by a first offset the voltage of the IOUT node. Such disabling of the startup current circuit may occur upon detecting a single voltage excursion on the DISABLE input, or upon detecting multiple voltage excursions on the DISABLE input, or after a certain delay time after detecting one or more voltage excursions on the DISABLE input, or any number of similar variations. Such configuration may be predetermined at manufacture, or may be determined by one or more external components coupled to the Startup IC.

Figure 5:
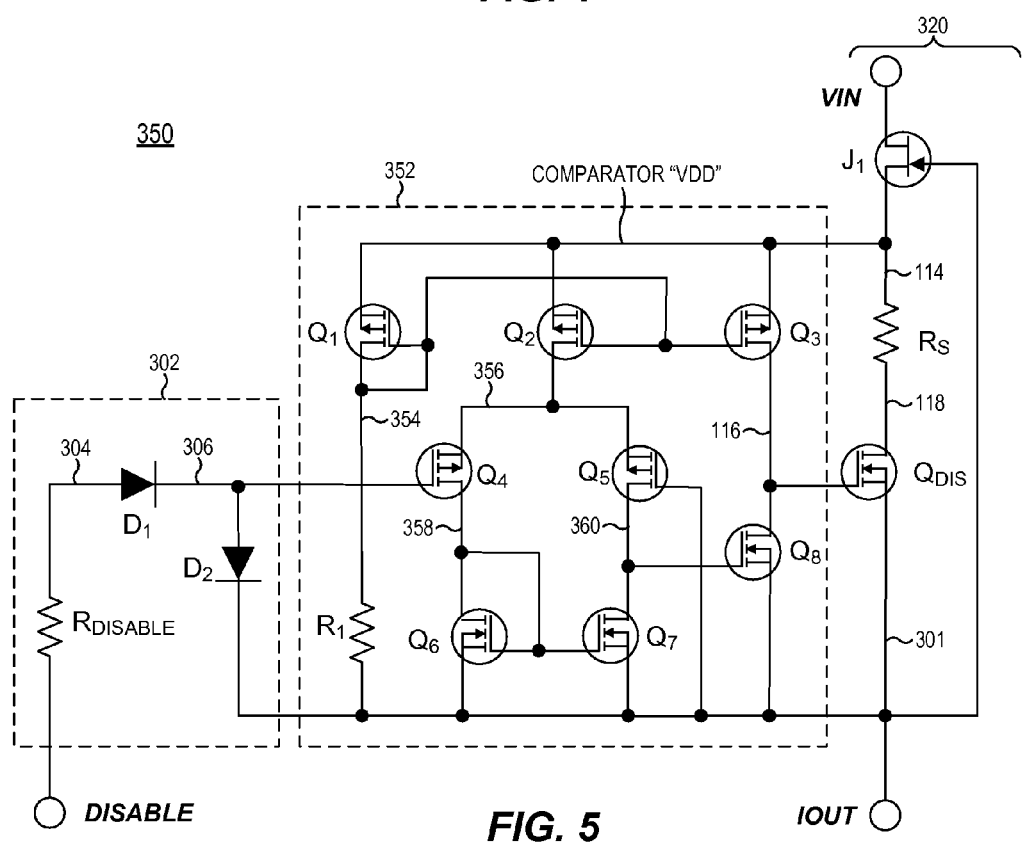
FIG. 5 is a schematic diagram of an exemplary configuration of a startup circuit shown in previous figures.

Referring now to FIG. 5, a schematic diagram is shown corresponding to an exemplary implementation of the block diagram shown in FIG. 4, and as simulated with a version of the well-known SPICE circuit simulator. The offset voltage may be implemented by appropriate sizing of transistors, e.g. by the relative widths of the transistors $Q_4$ and $Q_5$, without need for a voltage reference circuit 312 (i.e., shown in FIG. 4). A SPICE circuit simulation input file is reproduced below under the heading "Computer Program Listing." FIGS. 6-11 depict output plots from SPICE simulation showing exemplary operation of the circuit shown in FIG. 5.

Figure 6:
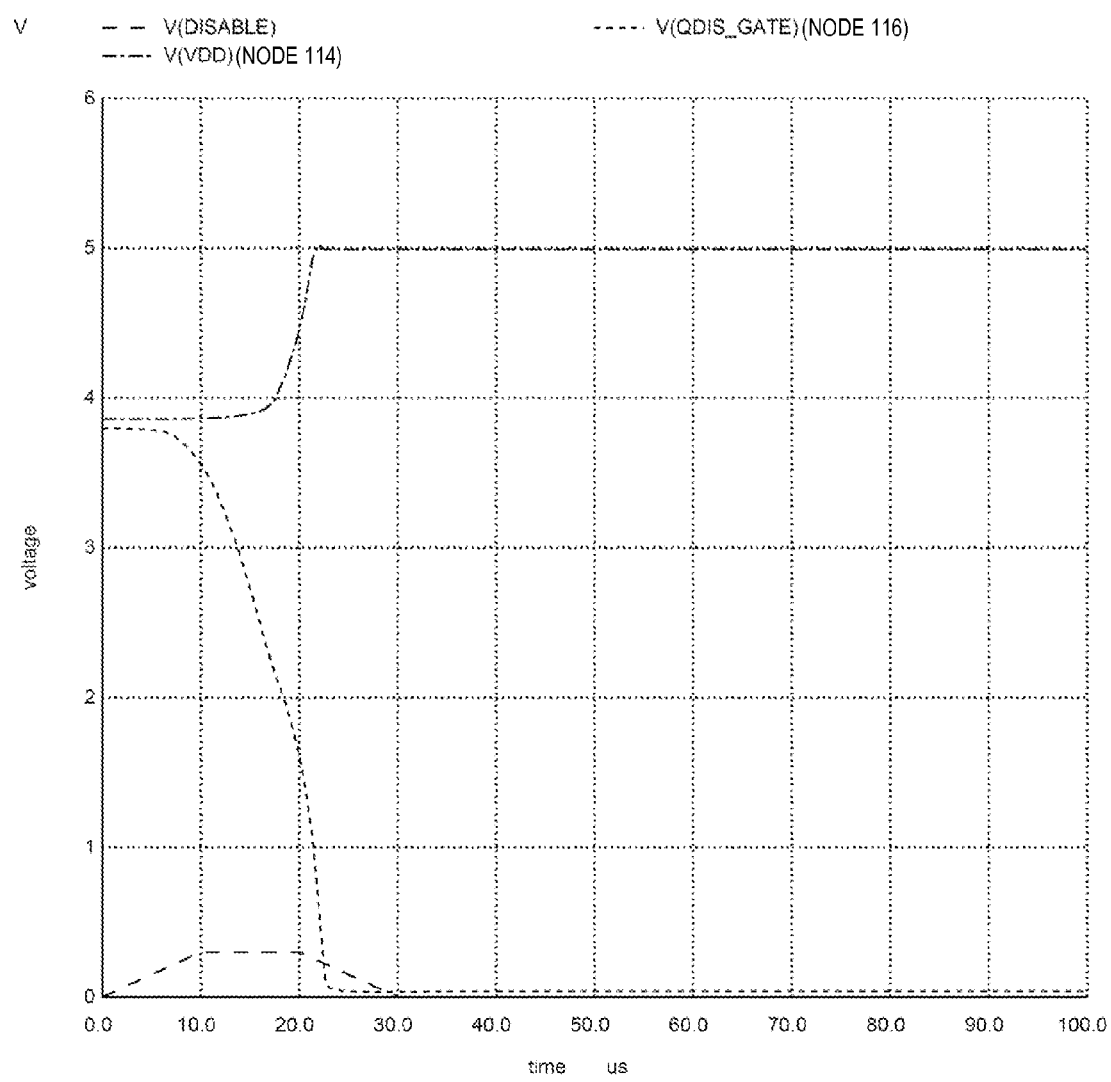
FIGS. 6-11 depict various simulation waveforms corresponding to the startup circuit shown in FIG. 5.

FIG. 6 depicts an output plot showing the transient response of the comparator's internal VDD node (i.e. node 114) and the gate of $Q_{DIS}$ (node 116) to a positive voltage pulse on the DISABLE input relative to the voltage of IOUT (i.e., node 301). As shown, a single pulse on the DISABLE input causes the gate voltage 116 to be discharged, thereby turning off $Q_{DIS}$ and thus disable the startup current circuit 320. The voltage of node 114 then rises to the threshold voltage of $J_1$ above node 301 (e.g., 5 V) at which point $J_1$ turns off.

Figure 7:
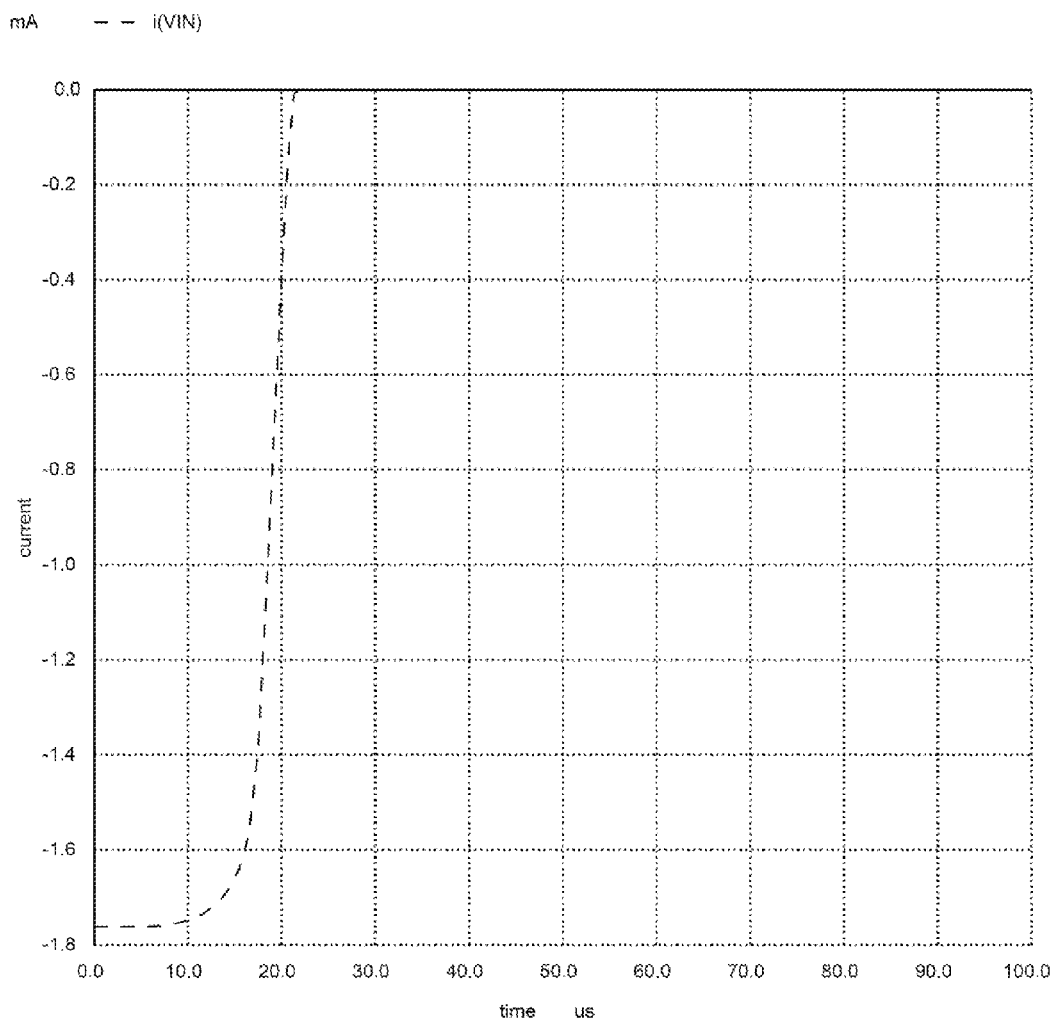

FIG. 7 depicts an output plot showing the transient response of the current from the voltage source connected to VIN in response to the positive voltage pulse on the DISABLE input from FIG. 6. A startup current of approximately 1.8 mA is turned off in response to the positive voltage pulse on the DISABLE input.

Figure 8:
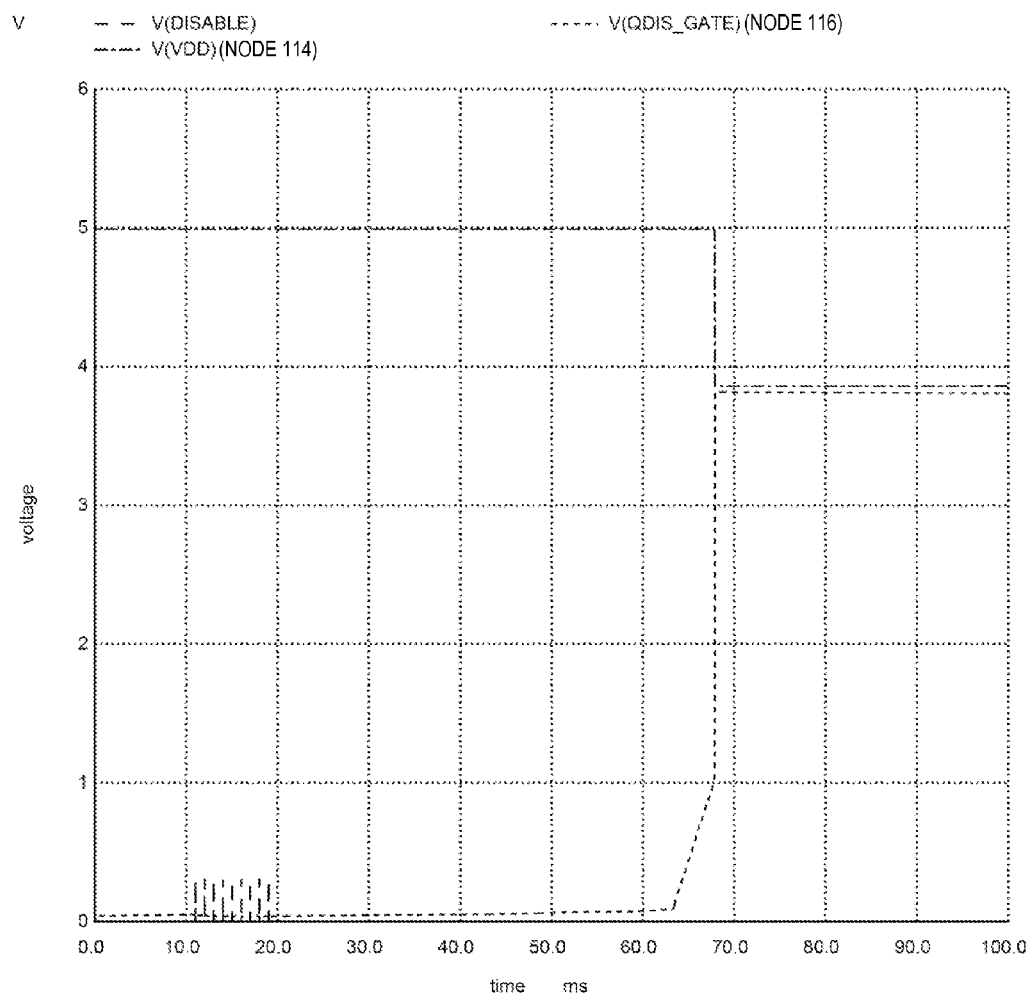
Figure 9:
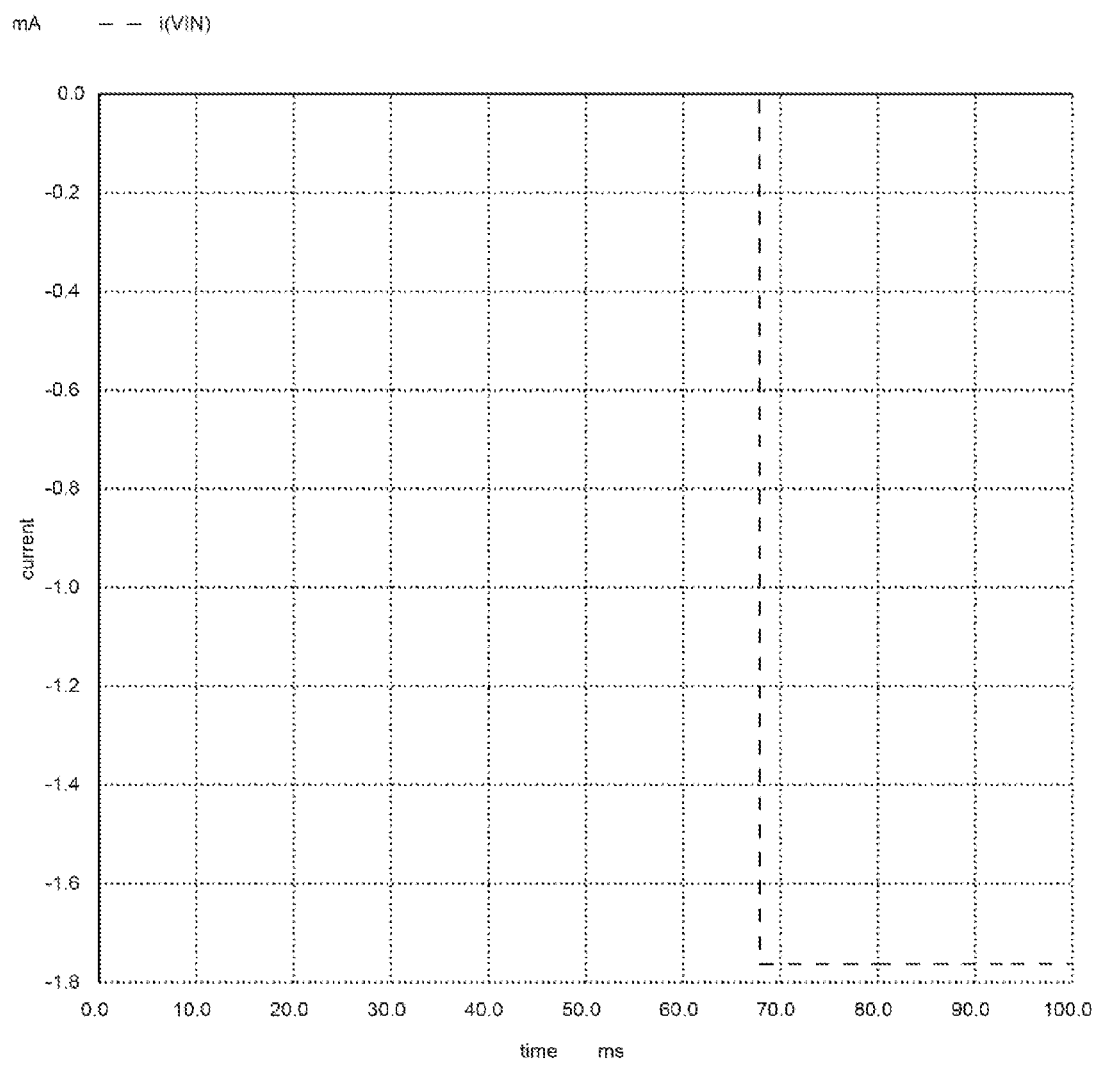

FIG. 8 depicts an output plot showing the transient response of the internal VDD node of the comparator (i.e. node 114) and the gate of $Q_{DIS}$ (node 116) to a sequence of low duty cycle positive pulses on the DISABLE input, and the response to an absence of pulses on DISABLE. The low duty cycle pulses occurring from 10 ms to 20 ms represent 1 pulse every millisecond, which corresponds to the operating frequency of many SMPS systems at "no-load" conditions. Under normal load conditions, such SMPS systems operate at higher frequencies. About 45 ms after the last DISABLE pulse, the gate of $Q_{DIS}$ (node 116) is driven high to re-enable the startup current, which returns to a value of approximately 1.8 mA as shown in FIG. 9. This time-out delay affords comfortable margin to prevent accidentally re-enabling the startup current circuit.

Figure 10:
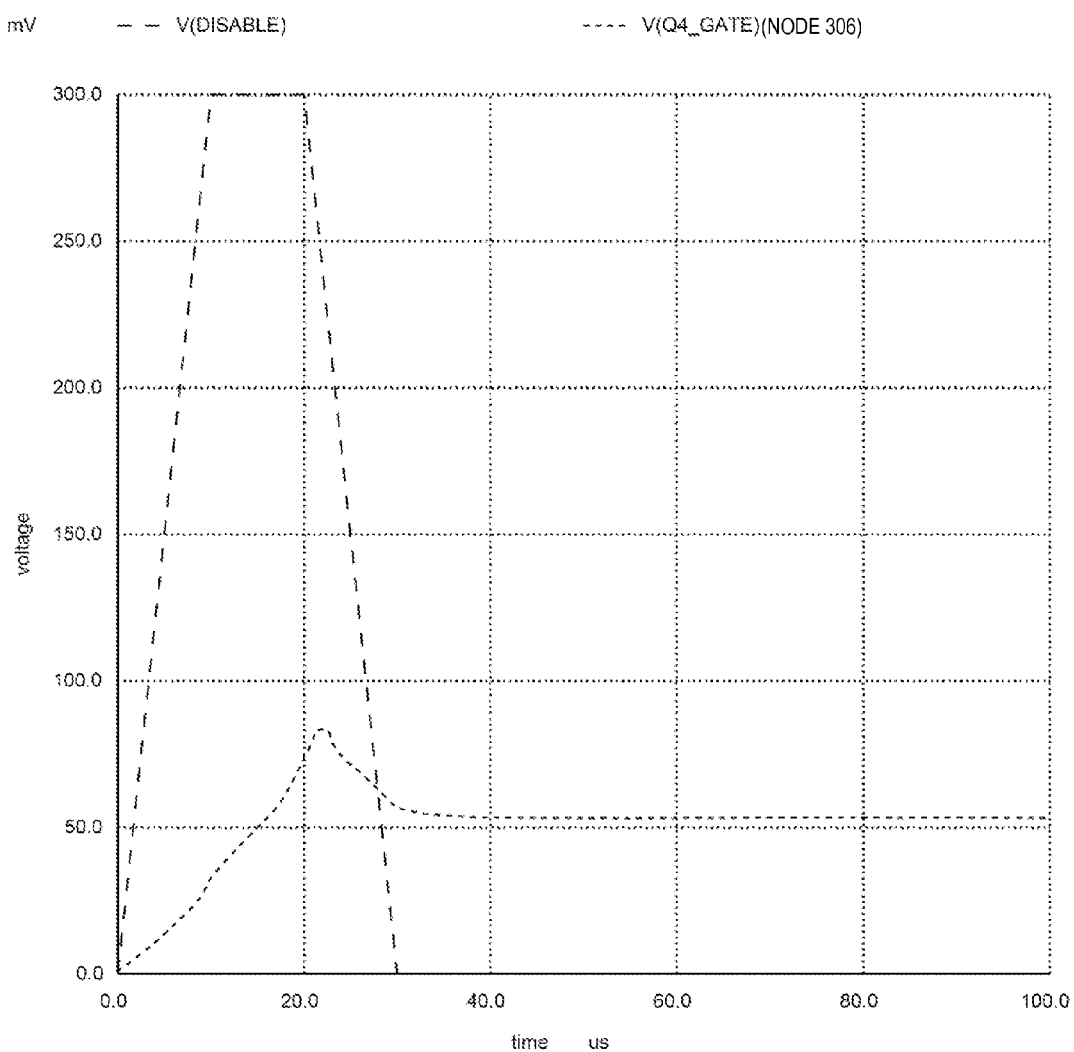

FIG. 10 depicts an output plot showing the asymmetric response of the input circuit 302 in response to a pulse on the DISABLE input. Node 306 is charged quickly by current through resistor $R_{DISABLE}$ and diode $D_1$ in response to a positive voltage on the DISABLE input, but node 306 is discharged only by the forward-leakage current through D2 and the much lower reverse-leakage current through D1. Consequently, the output node 306 of this input circuit 302 responds quickly to a positive voltage on the DISABLE input, but responds slowly to the absence of a positive voltage on the DISABLE input. At low forward voltages, the forward current through diodes D1 and D2 may be in the nano-Amp range, but diodes D1 and D2 also function as a capacitive divider to couple a voltage onto output node 306 that is approximately half of the voltage transition on node 304 (assuming D1 and D2 are identical).

Figure 11:
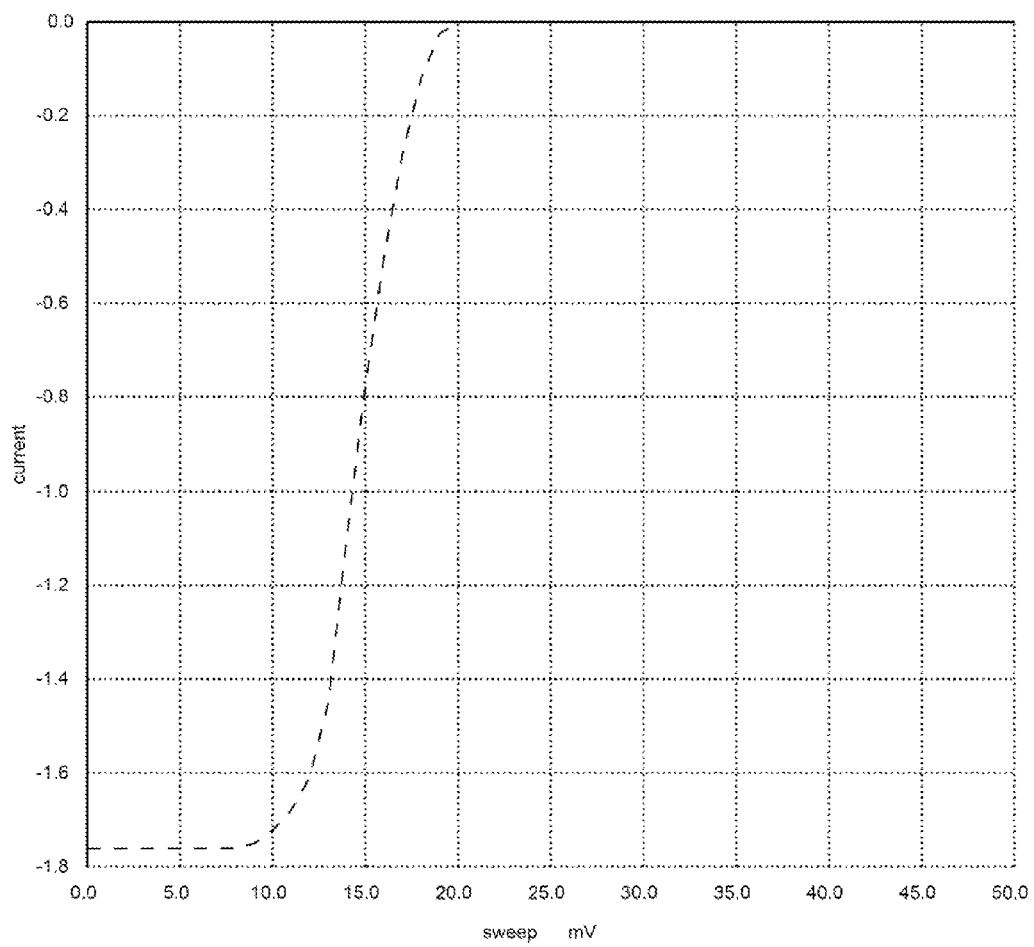

FIG. 11 depicts an output plot showing the DC transfer function between the DISABLE input and the current drawn from the VIN voltage source. This shows the inherent voltage offset of the DISABLE input. In this example, the offset is approximately 10-20 mV. Preferably the offset is chosen in the range of 10-500 mV depending upon the specific requirements of a given application, although higher offset voltages are also contemplated for certain embodiments. More preferably the offset is chosen in the range of 200-500 mV which is large enough to provide a suitable margin so that the comparator 352 does not disable the startup current circuit 320 when the respective voltages of the DISABLE input and the IOUT node 301 are substantially identical, but small enough to be easily generated at the output node of a simple input circuit, such as input circuit 302 which uses a diode clamp on its output node.

Figure 12:
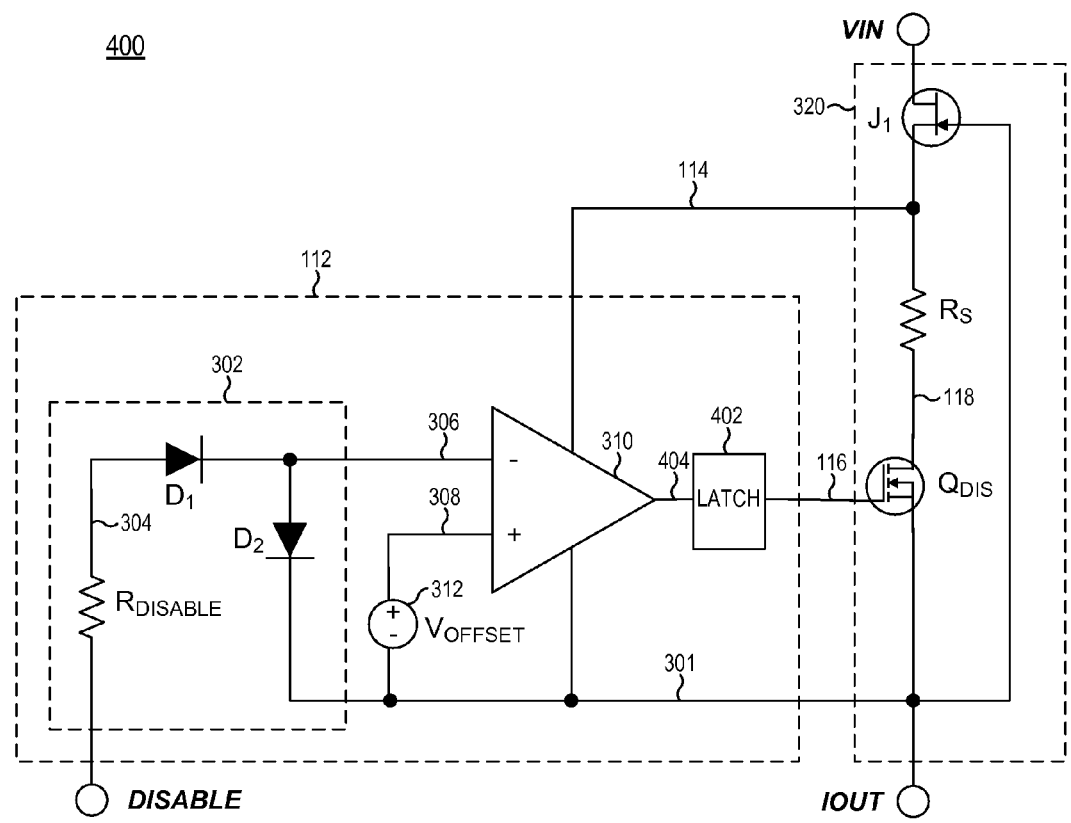
FIG. 12 is a schematic diagram of an exemplary configuration of a startup circuit shown in previous figures.

As described for the embodiments above, the Startup IC may be designed to provide for automatic reconnection of the startup current and automatic restart of the SMPS if there have been no pulses detected on the DISABLE input for a period of time and there is still voltage on the high-voltage source. In certain other embodiments, the Startup IC may incorporate latching of the DISABLE signal to prevent such automatic restarting of the SMPS. FIG. 12 depicts such a Startup IC which is similar to that shown in FIG. 4 but with the addition of a latch 402 as part of the ultra-low-power control circuit 112. When the output of the comparator 310 first switches to disable the startup current circuit 320, the latch 402 drives node 116 to the voltage of the IOUT node 301 to thereby turn off the $Q_{DIS}$ transistor. If the comparator later detects an absence of pulses and tries to re-start the SMPS system, the latch maintains the voltage on node 116 and holds $Q_{DIS}$ off. To reset the latch 402 and re-start the SMPS system, the voltage of the VIN node must be reduced to below the minimum operating voltage of the circuit 112. Typically this would occur if the source of voltage is removed altogether from the VIN node.

The exemplary Startup IC embodiments described above can work without modification with many different Control IC's from multiple suppliers, and in a variety of applications. Design and layout of such an SMPS system is simplified since the Startup IC (e.g., in the embodiments shown) has only three terminals, only one of which is a high-voltage terminal. Such a Startup IC is contemplated to be manufactured in an integrated circuit form, and may be so manufactured using a two-metal, one-poly CMOS process and assembled in a low-cost plastic package, as well as any number of other semiconductor process and packaging technologies. However, such a Startup IC as described herein may also be implemented using discrete components, and references to a "Startup IC" used throughout this disclosure are for convenience and clarity, and should not be taken to require an integrated circuit implementation. Fast startup time, independent of the input voltage, is provided by use of a current source rather than a resistor-controlled current. Yet the Startup IC contributes negligible power loss when the SMPS system is operating due to the extremely low standby current within the Startup IC. The reduced component count for such an SMPS system affords improved system manufacturability.

SMPS circuits are frequently designed for use with line voltages as high as 264 VAC (240V+10%), which when rectified results in a voltage as high as 373 VDC. As a result, a suitable package may be selected so that a fault condition in which the startup current is never disabled is not destructive or unsafe. For example, a 1 mA startup current flowing permanently through a faulty device driven by a 373 VDC input voltage will dissipate 373 mW, and an appropriate package that can tolerate such power dissipation may be required. Such a package preferably uses materials and processes compatible with the lateral peak electric field across the large JFET transistor or depletion MOS transistor. For example, certain plastic compounds used frequently in low voltage circuits contain ionic contaminants that tend to migrate in the presence of moisture and the high electric fields found in high voltage circuits, and change the electronic properties of certain devices such as transistor threshold voltage. As a result, plastic compounds having low ionic content and suitable for high voltage use are preferably used. In addition, care may be exercised to ensure that no safety issue is caused by a single-point "open failure" or a single-point "short failure" within the Startup IC or related to an external connection to the Startup IC.

In addition to the applications described above, the inventive aspects can be applied to numerous other SMPS applications, including but not limited to power factor control systems and power supplies for lighting systems, and may be used in conjunction with many different SMPS circuit topologies.

As used herein, a transistor control terminal corresponds to the gate terminal of a MOSFET and JFET, and corresponds to the base terminal of a bipolar junction transistor (BJT). A transistor that is coupled between two nodes refers to the current-carrying terminals of the transistor rather than the control terminal, unless the context so requires. For a MOSFET and a JFET the current-carrying terminals are the source and drain terminals, while for a BJT the current-carrying terminals are the collector and emitter terminals. As used herein, the word "coupled" includes both directly coupled and indirectly coupled.

While circuits and physical structures have been generally presumed in describing embodiments of the invention, it is well recognized that in modern semiconductor design and fabrication, physical structures and circuits may be embodied in a computer readable medium as data structures for use in subsequent design, simulation, test, or fabrication stages. For example, such data structures may encode a functional description of circuits or systems of circuits. The functionally descriptive data structures may be, e.g., encoded in a register transfer language (RTL), a hardware description language (HDL), in Verilog, or some other language used for design, simulation, and/or test. Data structures corresponding to embodiments described herein may also be encoded in, e.g., Graphic Database System II (GDSII) data, and functionally describe integrated circuit layout and/or information for photomask generation used to manufacture the integrated circuits. Other data structures, containing functionally descriptive aspects of embodiments described herein, may be used for one or more steps of the manufacturing process.

Computer-readable storage media include non-transitory, tangible computer readable media, e.g., a disk, tape, or other magnetic, optical, semiconductor (e.g., flash memory card, ROM), or electronic storage medium. In addition to computer-readable storage medium having encodings thereon of circuits, systems, and methods, the computer readable storage media may store instructions as well as data that can be used to implement embodiments described herein or portions thereof. The data structures may be utilized by software executing on one or more processors, firmware executing on hardware, or by a combination of software, firmware, and hardware, as part of the design, simulation, test, or fabrication stages.

The foregoing detailed description has described only a few of the many possible embodiments of the present invention. For this reason, this detailed description is intended by way of illustration, and not by way of limitations. Variations and modifications of the embodiments disclosed herein may be made based on the description set forth herein. It is only the following claims, including all equivalents, that are intended to define the invention.

---

COMPUTER PROGRAM LISTING

```
* This is a SPICE simulation of a bootstrap circuit designed to disable
* based on sensing current in RAUX. This implementation uses a 2-stage
* comparator to drive the gate of QDIS. Copyright Zahid Ansari.
* =========================== CIRCUIT =================
* High Voltage Rail
VIN 12 0 DC 20V
* Test using short pulses with low duty cycle representative of SMPS
* at no load
VDISABLE DISABLE 0 PWL(
+ 0 0 0.01m 300mV 0.02m 300mV 0.03m 0
+ 11m 0 11.01m 300mV 11.02ms 300mV 11.03m 0
+ 12m 0 12.01m 300mV 12.02ms 300mV 12.03m 0
+ 13m 0 13.01m 300mV 13.02ms 300mV 13.03m 0
+ 14m 0 14.01m 300mV 14.02ms 300mV 14.03m 0
+ 15m 0 15.01m 300mV 15.02ms 300mV 15.03m 0
+ 16m 0 16.01m 300mV 16.02ms 300mV 16.03m 0
+ 17m 0 17.01m 300mV 17.02ms 300mV 17.03m 0
+ 18m 0 18.01m 300mV 18.02ms 300mV 18.03m 0
+ 19m 0 19.01m 300mV 19.02ms 300mV 19.03m 0
+ ) ac 1.0 dc 0.50
* Current mirrors
MQ1 9 9 3 3 PMOS1 W=20U L=50U
MQ2 7 9 3 3 PMOS1 W=20U L=50U
MQ3 QDIS_GATE 9 3 3 PMOS1 W=20U L=50U
R1 9 0 100000K
* Comparator stage
MQ4 5 Q4_GATE 7 7 PMOS1 W=6U L=40U
MQ5 6 0 7 7 PMOS1 W=5U L=40U
```

---

COMPUTER PROGRAM LISTING

```
MQ6 5 5 4 4 NMOS1 W=5U L=50U
MQ7 6 5 4 4 NMOS1 W=5U L=50U
* Output pulldown in second gain stage of comparator
MQ8 QDIS_GATE 6 4 4 NMOS1 W=12U L=50U
* DISABLE Input resistor
RDISABLE DISABLE 15 1K
* Input diode - NOTE: These are done as body diodes in n-wells
* for this simulation
MD1 15 15 15 Q4_GATE PMOS1 W=20U L=2U
MD2 Q4_GATE Q4_GATE 4 4 NMOS1 W=20U L=2U
* Cascode FET that disconnects the startup current
MQDIS 11 QDIS_GATE 4 4 NMOS1 W=50U L=2U
* Series resistor to prevent source of JFET dropping too low
RS 11 VDD 2000
* JFET to High Voltage Input
J1 12 4 VDD J2N3819
* Current sense resistor (for current monitoring in simulation only)
RDD VDD 3 1
RSS 4 0 1
* ============================ MODELS =================
* SPICE Parameters
.MODEL NMOS1 NMOS VTO=1 KP=40U
+ GAMMA=1.0 LAMBDA=0.02 PHI=0.6
+ TOX=0.05U LD=0.5U CJ=5E-4 CJSW=10E-10
+ U0=550 MJ=0.5 MJSW=0.5 CGSO=0.4E-9 CGDO=0.4E-9
+ LEVEL=1
.MODEL PMOS1 PMOS VTO=-1 KP=15U
+ GAMMA=0.6 LAMBDA=0.02 PHI=0.6
+ TOX=0.05U LD=0.5U CJ=5E-4 CJSW=10E-10
+ U0=200 MJ=0.5 MJSW=0.5 CGSO=0.4E-9 CGDO=0.4E-9
+ LEVEL=1
*==
* JFET Model
.model J2N3819 NJF(Beta=1.304m Rd=1 Rs=1 Lambda=2.25m Vto=-5
+ Is=33.57f Cgd=1.6p Pb=1 Fc=.5 Cgs=2.414p Kf=9.882E-18 Af=1,
LEVEL=1)
*==
* ========================== ANALYSIS =================
*Analysis
.OP
.control
delete all
* Set the hardcopy default to Postscript and the output folder for plots
set hcopydevtype=postscript
set hcopypscolor
cd Macintosh\
HD:Users:za:Documents:Work:Bootstrap:spice:Bootstrap_RAUX:plots
* Transient analysis
tran 1us 100us 0.0 1us
plot i(VIN)
hardcopy 100us_i_vin.ps i(VIN)
plot V(DISABLE) V(QDIS_GATE) V(VDD)
hardcopy 100us_v_dis_disgate_vdd.ps V(DISABLE) V(QDIS_GATE) V(VDD)
plot V(DISABLE) V(Q4_GATE)
hardcopy 100us_v_dis_q4gate.ps V(DISABLE) V(Q4_GATE)
* Transient analysis
tran 10us 100ms 0.0 5us
plot i(VIN)
hardcopy 100ms_i_vin.ps i(VIN)
plot V(DISABLE) V(QDIS_GATE) V(VDD)
hardcopy 100ms_v_dis_disgate_vdd.ps V(DISABLE) V(QDIS_GATE) V(VDD)
* DC sweep to show input threshold
dc VDISABLE 0.0 50mV 1mV
plot i(VIN)
* Put out the transfer function into a file
write ivin_vs_vdisable.lst V(QDIS_GATE) i(VIN)
hardcopy ivin_vs_vdisable.ps i(VIN)
.endc
.END
```

What is claimed is:

1. A startup circuit for a switched-mode power supply, said startup circuit comprising:
   a voltage input node;
   an output current node;

a disable input node;
a startup current circuit configured to provide a startup current from the voltage input node to the output current node when enabled, and to block the startup current when disabled, said startup current being substantially constant in magnitude irrespective of a voltage difference between the voltage input node and the output current node; and
a control circuit configured to enable the startup current circuit when a voltage is first applied to the voltage input node, and to disable the startup current circuit in response to one or more voltage excursions on the disable input node which exceed by a first offset a voltage of the output current node;
wherein said control circuit comprises:
a first power supply node coupled to a first node of the startup current circuit;
a reference power supply node coupled to the output current node;
an input circuit having an input coupled to the disable input node, said input circuit configured to generate on an output node thereof a signal having different voltage and time characteristics relative to a signal coupled to its input node; and
a comparator circuit having a first input coupled to the input circuit output node, having a second input coupled to the output current node, and having an output coupled to an enable input for the startup current circuit, said comparator circuit configured to disable the startup current circuit when a voltage of the first input exceeds a voltage of the second input by a second offset.

2. The startup circuit as recited in claim 1 wherein:
the control circuit draws a standby current that is less than 1% of the startup current irrespective of the voltage difference between the voltage input node and the output current node.

3. The startup circuit as recited in claim 1 wherein:
the first offset is within the range of 10-500 mV.

4. The startup circuit as recited in claim 1 wherein:
the first offset is within the range of 200-500 mV.

5. The startup circuit as recited in claim 1 wherein the startup current circuit comprises:
a normally-on transistor coupled between the voltage input node and the first node, having a control terminal coupled to the output current node;
a resistor coupled between the first node and a second node; and
a transistor switch device coupled between the second node and the output current node, having a control terminal coupled to an output node of the control circuit.

6. The startup circuit as recited in claim 5 wherein the startup circuit is implemented on a monolithic integrated circuit.

7. The startup circuit as recited in claim 6 wherein the monolithic integrated circuit is capable of operating with a voltage difference as high as 373 volts between the voltage input node and the output current node.

8. The startup circuit as recited in claim 6 wherein:
the normally-on transistor comprises a junction field effect transistor (JFET); and
the transistor switch device comprises an insulated gate field effect transistor (IGFET).

9. The startup circuit as recited in claim 8 wherein said input circuit is configured to generate on its output node an asymmetric signal relative to the signal coupled to its input node.

10. The startup circuit as recited in claim 9 wherein the monolithic integrated circuit is capable of operating with a voltage difference as high as 373 volts between the voltage input node and the output current node.

11. The startup circuit as recited in claim 10 wherein the monolithic integrated circuit is encapsulated using a low ionic content plastic compound to form a package that can tolerate steady-state power dissipation resulting from the startup current continuously flowing between the voltage input node and the output current node with a voltage difference as high as 373 volts between the voltage input node and the output current node.

12. The startup circuit as recited in claim 1 wherein said input circuit is configured to generate on its output node an asymmetric signal relative to the signal coupled to its input node.

13. The startup circuit as recited in claim 1 wherein:
the control circuit further comprises a latch circuit configured so that the startup current circuit, once disabled by the comparator circuit, remains disabled even in an absence of voltage excursions on the disable input node.

14. The startup circuit as recited in claim 1 wherein:
the second offset is within the range of 10-500 mV.

15. The startup circuit as recited in claim 14 wherein the first offset and the second offset are different in magnitude.

16. A computer-readable non-transitory storage medium including data structures encoding information useful for design, simulation, test, or fabrication of the startup circuit recited in claim 1.

17. The startup circuit as recited in claim 1 wherein the control circuit further comprises an offset voltage reference circuit coupled between the output current node and the second input of the comparator circuit.

18. The startup circuit as recited in claim 1 further comprising a power-coupling circuit path between the disable input node and the first power supply node of the control circuit.

19. A switched-mode power supply (SMPS) circuit comprising:
a startup circuit having a voltage input node, an output current node, and a disable input node, said startup circuit comprising:
a startup current circuit configured to provide a startup current from the voltage input node to the output current node when enabled, and to block the startup current when disabled, said startup current being substantially constant in magnitude irrespective of a voltage difference between the voltage input node and the output current node; and
a control circuit configured to enable the startup current circuit when a voltage is first applied to the voltage input node, and to disable the startup current circuit in response to one or more voltage excursions on the disable input node which exceed by a first offset a voltage of the output current node;
wherein said control circuit comprises:
a first power supply node coupled to a first node of the startup current circuit;
a reference power supply node coupled to the output current node;
an input circuit having an input coupled to the disable input node, said input circuit configured to generate on an output node thereof a signal having different voltage and time characteristics relative to a signal coupled to its input node; and
a comparator circuit having a first input coupled to the input circuit output node, having a second input coupled to the output current node, and having an output coupled to an enable input for the startup current circuit, said comparator circuit configured to disable the startup current circuit when a voltage of the first input exceeds a voltage of the second input by a second offset;

said SMPS circuit further comprising:
a switched-mode control circuit having a power supply terminal coupled to the output current node, having a ground terminal, and being configured when operational to pulse current through a coil of an energy storage transformer or inductor of the SMPS circuit; and
means for generating voltage excursions on the disable input node in response to said current pulses through said coil.

20. The switched-mode power supply circuit as recited in claim 19 wherein:
the startup circuit is implemented on a monolithic integrated circuit; and
the first offset is determined by one or more external components coupled to the monolithic integrated circuit.

21. The switched-mode power supply circuit as recited in claim 19 wherein the means for generating comprises:
a coupling capacitor disposed between the disable input node and another node that exhibits a time-varying voltage waveform when the switched-mode control circuit is operational.

22. The switched-mode power supply circuit as recited in claim 19 wherein the means for generating comprises:
a direct connection from the disable input node to another node that exhibits a time-varying voltage waveform having voltage excursions that exceed the voltage of the output current node when the switched-mode control circuit is operational.

23. A method for starting up a switched-mode power supply (SMPS) circuit, said method comprising:
providing a startup current to a power supply terminal of a switched-mode control circuit to thereby develop an increasing voltage on the power supply terminal, said startup current being substantially constant in magnitude irrespective of the magnitude of an input voltage provided to the SMPS circuit;
generating on a disable node a voltage excursion exceeding by a first offset the voltage of the power supply terminal when the switched-mode control circuit begins to operate; and
disabling the startup current provided to the power supply terminal in response to the voltage excursion on the disable node, said disabling comprising:
generating an output signal on an input circuit output node, said input circuit having an input node coupled to the disable node, said output signal having different voltage and time characteristics relative to a signal coupled to its input node;
generating an output signal on an output of a comparator circuit, said comparator circuit having a first input coupled to the input circuit output node, having a second input coupled to the power supply terminal, and having said output coupled to an enable input for a startup current circuit, said output signal being suitable to disable the startup current circuit when a voltage of the first comparator input exceeds a voltage of the second comparator input by a second offset.

24. The method as recited in claim 23 further comprising:
re-enabling the startup current provided to the power supply terminal upon an absence, for a first duration, of a voltage excursion on the disable node.

25. The method as recited in claim 23 wherein:
the first offset is within the range of 10-500 mV.

26. The method as recited in claim 23 further comprising:
generating a respective voltage excursion on the disable node for each respective current pulse through a coil of an energy storage transformer or inductor of the SMPS circuit, each respective voltage excursion exceeding by the first offset the voltage of the power supply terminal.

27. The method as recited in claim 23 wherein:
the voltage excursion on the disable node constantly exceeds by the first offset the voltage of the power supply terminal so long as the switched-mode control circuit continues to operate.

28. A method for making a startup circuit product for a switched-mode power supply, said method comprising:
providing a voltage input node;
providing an output current node;
providing a disable input node;
providing a startup current circuit configured to provide a startup current from the voltage input node to the output current node when enabled, and to block the startup current when disabled, said startup current being substantially constant in magnitude irrespective of the voltage difference between the voltage input node and the output current node; and
providing a control circuit configured to enable the startup current circuit when a voltage is first applied to the voltage input node, and to disable the startup current circuit after a voltage conveyed to the disable input node exceeds by a first offset a voltage of the output current node;
wherein said control circuit comprises:
a first power supply node coupled to a first node of the startup current circuit;
a reference power supply node coupled to the output current node;
an input circuit having an input coupled to the disable input node, said input circuit configured to generate on an output node thereof a signal having different voltage and time characteristics relative to a signal coupled to its input node; and
a comparator circuit having a first input coupled to the input circuit output node, having a second input coupled to the output current node, and having an output coupled to an enable input for the startup current circuit, said comparator circuit configured to disable the startup current circuit when a voltage of the first input exceeds a voltage of the second input by a second offset.

29. The method as recited in claim 28 further comprising fabricating the startup circuit as a monolithic integrated circuit that is capable of operating with a voltage difference as high as 373 volts between the voltage input node and the output current node.

30. The method as recited in claim 29 further comprising encapsulating the monolithic integrated circuit using a low ionic content plastic compound to form a package that can tolerate steady-state power dissipation resulting from the startup current continuously flowing between the voltage input node and the output current node with a voltage difference as high as 373 volts between the voltage input node and the output current node.

* * * * *